(12) United States Patent
Lifka (10) Patent No.: US 10,493,538 B2
(45) Date of Patent: Dec. 3, 2019

(54) APPARATUS FOR PROCESSING CYLINDER WALLS OF INTERNAL COMBUSTION ENGINES

(71) Applicant: Hoffmann GmbH Qualitätswerkzeuge, München (DE)

(72) Inventor: Josef Lifka, Furth (DE)

(73) Assignee: Hoffmann GmbH Qualitätswerkzeuge, München (DE)

( * ) Notice: Subject to any disclaimer, the term of this patent is extended or adjusted under 35 U.S.C. 154(b) by 0 days.

(21) Appl. No.: 15/886,963

(22) Filed: Feb. 2, 2018

(65) Prior Publication Data

US 2018/0229314 A1 Aug. 16, 2018

(30) Foreign Application Priority Data

Feb. 15, 2017 (DE) .......................... 10 2017 202 394
Dec. 13, 2017 (EP) ...................................... 17207053

(51) Int. Cl.
*B23B 41/12* (2006.01)
*B23C 5/08* (2006.01)
(Continued)

(52) U.S. Cl.
CPC .................. *B23C 3/34* (2013.01); *B23C 3/02* (2013.01); *B23C 5/04* (2013.01); *B23C 5/12* (2013.01); *B23C 5/2217* (2013.01); *C23C 4/02* (2013.01); *C23C 4/123* (2016.01); *F02F 1/18* (2013.01); *B23C 5/28* (2013.01); *B23C 2200/081* (2013.01); *B23C 2200/326* (2013.01); *B23C 2210/165* (2013.01); *B23C 2210/244* (2013.01); *B23C 2210/486* (2013.01);
(Continued)

(58) Field of Classification Search
CPC ....... B23C 2215/242; B23C 3/34; B23C 5/08; B23C 2210/242; B23C 2210/244; B23C 2200/081; B23C 2200/326; B23C 2210/165; B23C 2210/486; B23C 2210/74; B23C 2220/36; B23C 2220/52; B23C 2220/60; B23C 2226/31; B23C 2250/12; B23C 5/12; B23C 5/28; B23C 3/02; B23C 5/2217; B23C 4/123; F02F 1/18; C23C 5/04; C23C 4/02
See application file for complete search history.

(56) References Cited

U.S. PATENT DOCUMENTS 1,291,467 A * 1/1919 Forester ................ B23B 51/108
144/233
1,428,308 A 9/1922 Wiard
(Continued)

FOREIGN PATENT DOCUMENTS

DE 102008015582 A1 9/2009
DE 102013108604 A1 2/2014
(Continued)

*Primary Examiner* — Sara Addisu
(74) *Attorney, Agent, or Firm* — Rankin, Hill & Clark LLP (57) ABSTRACT

The invention relates to an apparatus for processing cylinder walls of internal combustion engines (1), including a cutting element (4). The cutting element (4) is arranged on a rotary cutting ring (3). The cutting element (4) has a slit contour (5) with a plurality of cutting edges (6) arranged next to each other in a direction of an axis of rotation of the rotary cutting ring. And, the individual cutting edges (6) face in a direction of rotation of the rotary cutting ring.

12 Claims, 6 Drawing Sheets

(51) Int. Cl.
- *B23C 5/12* (2006.01)
- *B23C 5/22* (2006.01)
- *F02F 1/18* (2006.01)
- *B23C 3/34* (2006.01)
- *B23C 3/02* (2006.01)
- *B23C 5/04* (2006.01)
- *C23C 4/02* (2006.01)
- *C23C 4/123* (2016.01)
- *B23C 5/28* (2006.01)

(52) U.S. Cl.
CPC .... *B23C 2210/74* (2013.01); *B23C 2215/242* (2013.01); *B23C 2220/36* (2013.01); *B23C 2220/52* (2013.01); *B23C 2220/60* (2013.01); *B23C 2226/31* (2013.01); *B23C 2250/12* (2013.01)

(56) References Cited

U.S. PATENT DOCUMENTS

| | | | | |
|---|---|---|---|---|
| 2,212,753 | A * | 8/1940 | Flater | B23D 77/00 408/217 |
| 2,975,507 | A * | 3/1961 | Wilder | B23G 5/18 279/2.11 |
| 3,102,441 | A * | 9/1963 | Milewski | B23B 29/03403 407/79 |
| 3,888,161 | A | 6/1975 | Baudermann | |
| 3,986,543 | A * | 10/1976 | Slayton | B27G 13/005 144/236 |
| 4,464,086 | A * | 8/1984 | Bentjens | B23C 5/12 407/25 |
| 4,563,929 | A * | 1/1986 | Ringlee | A01G 23/091 144/241 |
| 4,655,648 | A * | 4/1987 | Hellbergh | B23C 5/16 144/218 |
| 4,728,228 | A * | 3/1988 | Okunishi | B23C 5/207 407/35 |
| 5,158,400 | A * | 10/1992 | Skinner | B23F 21/243 407/12 |
| 5,201,353 | A * | 4/1993 | Weill | B23C 5/00 144/208.4 |
| 5,290,135 | A * | 3/1994 | Ball | B23F 21/22 407/11 |
| 5,480,272 | A * | 1/1996 | Jorgensen | B23G 5/06 408/222 |
| 5,626,189 | A * | 5/1997 | Hutchinson | E21B 29/00 166/55.6 |
| 6,499,917 | B1 * | 12/2002 | Parker | B23C 5/109 407/25 |
| 7,363,692 | B2 * | 4/2008 | Kress | B23B 51/009 29/50 |
| 7,954,523 | B2 * | 6/2011 | Liu | B27G 13/04 144/117.1 |
| 9,168,595 | B2 * | 10/2015 | Heinloth | B23C 5/006 |
| 9,216,461 | B2 * | 12/2015 | Athad | B23C 5/006 |
| 9,352,402 | B2 * | 5/2016 | Luik | B23C 5/109 |
| 9,511,467 | B2 * | 12/2016 | Whitbeck | B24B 5/08 |
| 9,707,632 | B2 * | 7/2017 | Heinloth | B23C 5/08 |
| 9,764,398 | B2 * | 9/2017 | Tanaka | B23C 3/12 |
| 9,782,832 | B1 * | 10/2017 | Lambrick | B23B 29/0341 |
| 9,902,002 | B2 * | 2/2018 | Ning | B23D 77/00 |
| 2005/0183562 | A1 * | 8/2005 | Morris | B23C 3/34 83/880 |
| 2010/0058586 | A1 * | 3/2010 | Lundgren | B23C 3/34 29/890.01 |
| 2012/0051852 | A1 * | 3/2012 | Choi | B23C 5/2441 407/44 |
| 2014/0050544 | A1 | 2/2014 | Nedzlek et al. | |
| 2014/0360355 | A1 | 12/2014 | Whitbeck et al. | |
| 2014/0364042 | A1 * | 12/2014 | Whitbeck | B24B 5/08 451/51 |
| 2015/0037107 | A1 * | 2/2015 | Buob | B23C 5/08 407/44 |
| 2016/0001381 | A1 * | 1/2016 | Lach | B23B 51/0493 407/11 |
| 2016/0169149 | A1 | 6/2016 | Hahn et al. | |

FOREIGN PATENT DOCUMENTS

| | | | |
|---|---|---|---|
| DE | 102014210636 A1 | 12/2014 | |
| DE | 102013011726 A1 | 1/2015 | |
| DE | 102016216464 A1 * | 3/2018 | B23C 3/34 |
| EP | 2962796 A1 | 1/2016 | |
| RU | 1794634 C | 2/1993 | |
| WO | 2018041290 A1 | 3/2018 | |

* cited by examiner

APPARATUS FOR PROCESSING CYLINDER WALLS OF INTERNAL COMBUSTION ENGINES

CROSS-REFERENCE TO RELATED APPLICATIONS

This application claims priority to DE 10 2017 202 394.5, filed Feb. 15, 2017, and to EP 17 207 053.4, filed Dec. 13, 2017, both of which are hereby incorporated by reference in their respective entireties.

BACKGROUND OF INVENTION

Field of Invention

The invention relates to an apparatus for processing cylinder walls of internal combustion engines, comprising a cutting element.

Brief Description of Related Art

To save weight with internal combustion engines, the cylinder crankcase is frequently made of light metal such as aluminum. Since aluminum however is a comparatively soft metal, frequently strong wear phenomena occur in the region of the cylinder.

To reduce the wear phenomena, the inner walls of the cylinder are frequently lined with a coating that reduces friction. The coating is carried out by spraying on the molten coating material onto the cylinder inner wall.

To ensure effective adhesion of the coating to the cylinder inner wall, it is first processed using a special method. In particular, this is accomplished by introducing slits in the cylinder wall running around the circumference of the cylinder. Then the elevations remaining between the slits are plastically deformed by a rolling tool so that undercuts arise which enable improved adhesion of the coating.

Saw apparatuses can for example be used to introduce the slits in the cylinder wall. The document DE 10 2013 011 726 A1 describes a method that introduces slits into the cylinder walls of an internal combustion engine using such a saw tool, the arising bars are plastically deformed with the assistance of a rolling tool, and then a coating layer is applied to the cylinder wall by means of a spray head. The saw tool comprises an annular saw blade with a plurality of cutting teeth that introduce slits into the cylinder wall. After a slit is introduced, the saw apparatus is advanced in the direction of the axis of rotation, and another slit is introduced. In another embodiment, the saw tool comprises a plurality of saw blades arranged over each other which are used to simultaneously enter a plurality of slits.

Since the distance between the individual saw blades is however greater than the distance between the required slits, the tool must be shifted after a sawing process in the direction of the axis of rotation by a distance that corresponds to a fraction of the distance between the saw blades. Due to this shifting of the tool, the described process is comparatively time-consuming.

BRIEF SUMMARY OF THE INVENTION

The object of the invention is to provide an apparatus for processing cylinder walls of internal combustion engines comprising a cutting element that allows a rapid and reliable processing of cylinder walls.

This object is achieved by an apparatus for processing cylinder walls of internal combustion engines comprising a cutting element that is developed in that the cutting element is arranged on a rotary cutting ring, wherein the cutting element has a slit contour with a plurality of cutting edges arranged next to each other in a direction of an axis of rotation of the rotary cutting ring (e.g., arranged next to each other parallel to the axis of rotation of the rotary cutting ring), and wherein the individual cutting edges face in a direction of rotation of the rotary cutting ring. Thus, the individual cutting edges extend in the direction of rotation of the rotary cutting ring in such a manner that when the rotary cutting ring is rotated on its axis of rotation the cutting edges are oriented to contact and thereby process (e.g., cut slits into) the cylinder walls.

By using a cutting element with a slit contour having a plurality of cutting edges arranged next to each other in the direction of the axis of rotation of the rotary cutting ring, all of the required slits are introduced into the cylinder wall in a single cutting process. It is therefore unnecessary to shift the cutting ring in the direction of the axis of rotation.

In particular, the cutting element or cutting edges of the cutting element are made of diamond, whereby the cutting edges have improved protection against wear. Preferably, the cutting element is releasably connectable to the cutting ring. Cutting elements can thereby be easily and economically exchanged.

Preferably, the cutting elements are substantially cuboid, wherein the slit contour is introduced into one of the surfaces of the cuboid cutting element by cutting grooves. The cutting grooves preferably have a depth of 0.1 to 1 mm, especially preferably from 0.3 to 0.7 mm, and particularly preferably 0.5 mm. In a front view of the cutting grooves, they are preferably wider in the bottom region than in the top region, wherein the region of the cutting edges is provided in the top region that first engages with the workpiece. This yields improved cutting behavior. The cutting edges can moreover be freely ground in order to further improve the cutting behavior. It is moreover preferable when the cutting elements are provided with a pitch angle relative to a cut edge. The pitch angle preferably lies in a range from 1° to 3°.

Preferably, the cutting element is placed on a holding apparatus, wherein the holding apparatus is in particular releasably connectable to the cutting ring. This enables increased processing reliability with easy and economical exchangeability of the cutting elements, or respectively the holding apparatuses on which a cutting element is placed respectively.

Preferably, the cutting ring has at least one outer circumferential section with a substantially constant outer radius, at least one outer circumferential section with an outer radius that continuously changes in the direction of rotation, and at least one outer circumferential section with an outer edge that runs substantially in a radial direction.

Preferably, a surface of the cutting element or the holding apparatus lies on the outer circumferential section of the cutting ring with an outer radius that continuously changes in the direction of rotation, and another surface lies on the outer circumferential section of the cutting ring with an outer edge that runs substantially in the radial direction.

In particular, the cutting rings have an unchanging inner radius. The outer surface preferably comprises at least one outer circumferential section designed as a first circumferential section with a substantially constant outer radius, at least one outer circumferential section designed as a second circumferential section, in particular with an outer radius that continuously changes in the direction of rotation, and at least one outer circumferential section designed as a third circumferential section with an outer edge that runs substantially in a radial direction. In this manner, the cutting element or the holding apparatus with the cutting element attached thereto can be arranged on the cutting ring so that a first surface lies against the second circumferential section, and a second surface lies against the third circumferential section. Preferably, the first and second surface of the cutting element or the holding apparatus has a complementary shape with the regions of the second and third circumferential section against which these surfaces lie.

The circumferential sections can also be designed differently. For example, the second circumferential section can have an outer edge that changes in steps, or an outer edge with a constant radius that is smaller than the outer radius of the first circumferential section. Moreover, the third circumferential section can be formed at an angle of 0 to 45° to the radial in both directions.

Moreover, a plurality of cutting elements can be arranged on one cutting ring. In this regard, the cutting elements can be designed so that the cutting edges of the first cutting element are offset relative to the cutting edges of a second cutting element in the direction of the rotational axis. In this manner, the number of cutting edges that are needed to introduce the required slits can be distributed over a plurality of cutting elements. The cutting groove between the cutting edges of an individual cutting element is then greater in comparison to when just one cutting element is used. The offset between the cutting edge of the first cutting element and the cutting edge of the second cutting element according to this embodiment is a multiple of the distance between the cutting edges when only one cutting element is used to introduce the slits, such as twice the distance. This makes it possible to more easily remove the chips arising during the cutting process. The cutting edge of the first cutting element and the cutting edge of the second cutting element can be arranged on a cutting ring without being offset from each other in the direction of the axis of rotation. This minimizes the wear of the cutting elements.

Preferably three or four cutting elements can be provided on one cutting ring. Preferably five or six cutting elements can be provided on one cutting ring.

In a preferred embodiment, a plurality of cutting elements is arranged on a common axis of rotation by means of a mandrel. Each cutting ring has at least one cutting element that introduces all of the required slits during the cutting process at the overall height of the cutting ring in the cylinder. This allows the length of the individual cutting elements to be small in the direction of the axis of rotation so that the cutting elements can be easily produced and are procedurally stable. This enables much simpler production of the individual cutting elements.

Preferably 10 to 20 cutting rings can be provided as the plurality of cutting rings. Preferably, a plurality of cutting rings are used on a mandrel, wherein the number of cutting elements per cutting ring differs. Preferably in this regard a number of six cutting elements or five cutting elements is provided on an outermost cutting ring in the axis of rotation, whereas a number of three or four cutting elements is provided on the other cutting rings. This enables highly precise production.

Preferably, viewed in the direction of the rotational axis, the distance of a cutting element of a cutting ring to a cutting element of an adjacent cutting ring can be adjusted to a distance of two adjacent cutting edges of a cutting element. This yields an even slot/bar pattern in the cutting pattern of the cylinder. Alternatively in a preferred embodiment, a flush arrangement of the cutting elements of adjacent cutting rings can be provided in the direction of the axis of rotation.

Preferably, the cutting rings can be rotated and releasably fixed relative to each other at any angular distances in the rotational direction when mounted on the mandrel. In this manner, the chips can be more easily removed.

Preferably, the cutting ring has a cooling channel hole for cooling the cutting element. In this regard, the cooling channel hole is preferably located in an outer peripheral section with an outer radius that changes continuously in the direction of rotation close to the cutting element. A coolant is guided through the cooling channel hole that contacts the cutting element under the rotation of the cutting ring and protects the cutting element from overheating. A number of cooling channels are introduced into the mandrel to guide the coolant to the cooling channel holes. When mounting the cutting rings on the mandrel, a connection is accordingly established between cooling channels and cooling channel holes.

It is also preferable for the cutting ring to have a flushing hole to remove the chips generated during the cutting process. In this regard, the flushing hole is preferably located in the circumferential section of the cutting ring with the substantially constant outer radius. The flushing holes are connected to flushing channels in the mandrel through which a flushing agent is introduced.

Further features of the invention will become apparent from the description of embodiments according to the invention together with the claims and the included drawings. Embodiments according to the invention can fulfill individual characteristics or a combination of several characteristics.

BRIEF DESCRIPTION OF THE DRAWINGS

The invention is described below, without restricting the general idea of the invention, based on exemplary embodiments in reference to the drawings, wherein we expressly refer to the drawings with regard to the disclosure of all details according to the invention that are not explained in greater detail in the text. In the following.

In the drawings, the same or similar types of elements and/or parts are provided with the same reference numbers so that a re-introduction is omitted.

DETAILED DESCRIPTION OF THE INVENTION

Figure 1:
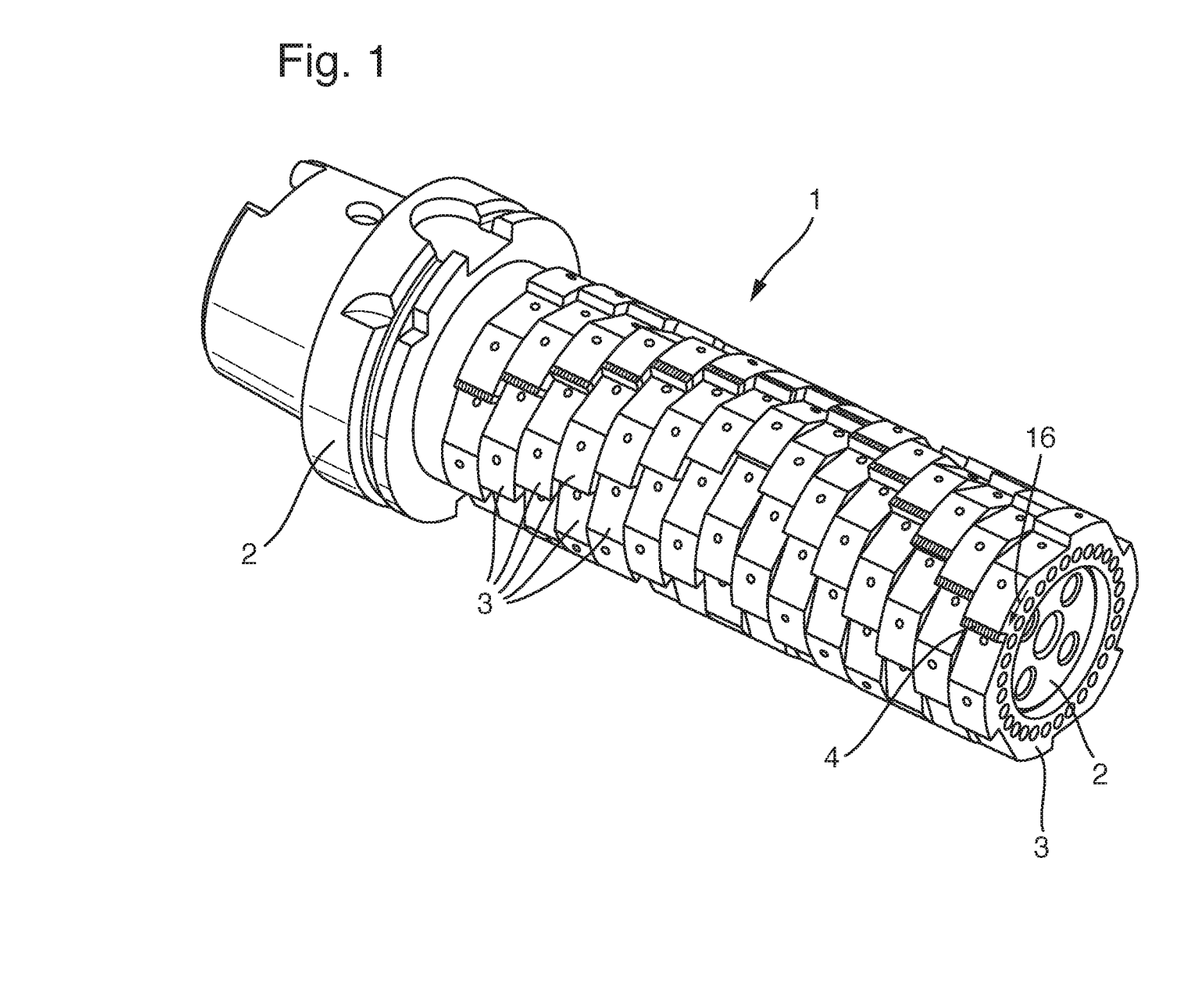
FIG. 1 shows a schematic perspective representation of the apparatus for processing cylinder walls of an internal combustion engine.

FIG. 1 shows a schematic perspective representation of an apparatus 1 for processing cylinder walls of an internal combustion engine with a mandrel 2 and a number of cutting rings 3. The cutting rings 3 are arranged next to each other or after each other on the mandrel 2.

Figure 2:
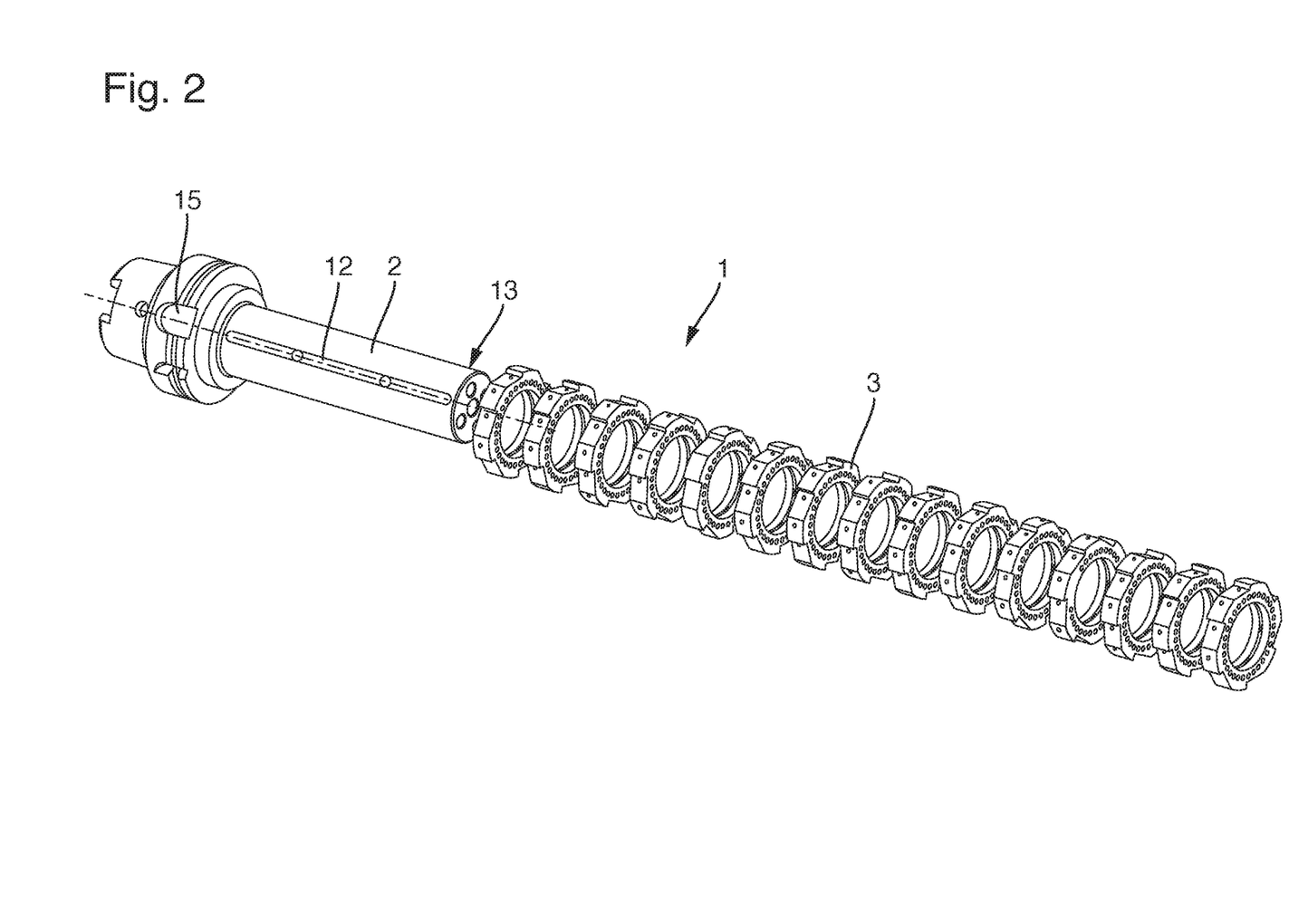
FIG. 2 shows a schematic exploded representation of the apparatus for processing cylinder walls of an internal combustion engine.

The schematic exploded representation of the apparatus 1 for processing cylinder walls of an internal combustion engine again illustrates the mounting of the cutting rings 3 on the mandrel 2. This is shown in FIG. 2.

The cutting rings 3 are arranged sequentially at the desired angle relative to the rotational axis 15 on the mandrel 2 where they are releasably fixed. The longitudinally axial extension of the mandrel 2 is selected so that all cutting elements 3 have precisely enough space there. The length in the direction of the rotational axis 15 of the cutting rings 3 lined up next to each other corresponds to the depth of the region of the cylinder wall in which the slits are introduced.

During the process of introducing slits into the cylinder wall, the mandrel 2 rotates, and the cutting rings 3 accordingly rotate about the rotational axis 15 that corresponds to the longitudinally axial direction, or respectively the longitudinal axis of the mandrel 2.

The maximum diameter of the cutting rings 3 is smaller than the inner diameter of the cylinder to be processed to enable the apparatus to easily enter into the interior of the cylinder to process cylinder walls of an internal combustion engine 1. To cut slits in the inner cylinder wall, the mandrel 2 rotates with the cutting rings 3 about the rotational axis 15. At the same time, the mandrel 2 is guided in a ring path so that the entire inner circumference of the cylinder to be processed is provided with slits. The ring path of the mandrel 2 can be a circular path; other ring paths are also conceivable.

By installing different cutting rings 3 on the mandrel 2 at different angles relative to each other from the rotational axis 15, the slit profile that is introduced at the height section of each individual cutting ring 3 into the cylinder wall can be varied. A plurality of slit profiles stacked on each other in the longitudinal axial direction of the cylinder can then be produced in the cylinder wall. This yields a further improvement of the adhesion properties of the coating layer on the inner cylinder wall.

Figure 3:
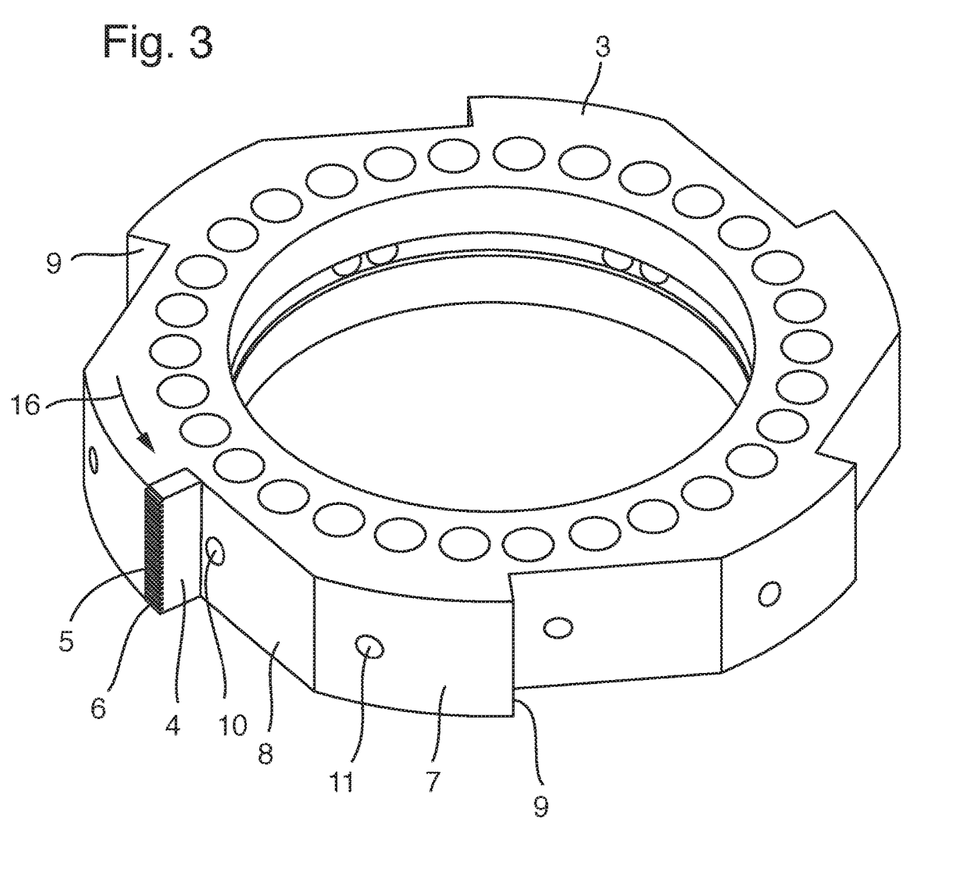
FIG. 3 shows a schematic, perspective representation of a cutting ring.

FIG. 3 shows a schematic perspective representation of the cutting ring 3. The inner radius of the cutting ring 3 is substantially constant, wherein a groove runs at the middle height of the inner circumference. The outer circumference of the cutting ring 3 can be basically divided into three types of sections: (1) an outer circumferential section with a substantially constant outer radius that is termed the first circumferential section 7 in the following, (2) an outer circumferential section with an outer radius that changes continuously in the rotational direction 16 which is termed the second circumferential section 8 in the following, and (3) an outer circumferential section with an outer edge that run substantially in the radial direction that is termed the third circumferential section in the following. In the embodiment in FIG. 3, six first, second and third circumferential sections 7, 8 and 9 are provided in each case.

The cutting element is 4 is arranged at the transition between a second circumferential section 8 and a third circumferential section 9. The cutting element 4 is preferably substantially cuboid, wherein the surface of the cuboid arranged on the second circumferential section 8 is shaped so that it lies flat on this circumferential section. This preferably also holds true likewise for the placement of the side surfaces of the cutting element 4 on the third circumferential section 9. The second circumferential section 8 can also have a stepped change in the outer radius. Depending on the geometric design of the second and third circumferential section 8, 9, the cutting element 4 is designed to have a complementary shape with the surfaces that lie on the second and third circumferential section 8, 9. Only one cutting element 4 is shown in FIG. 3. However, up to six cutting elements 4 can be or are placed on the portrayed cutting ring 3, in particular always lying against the circumferential section 9, or respectively the surface 9.

Figure 4:
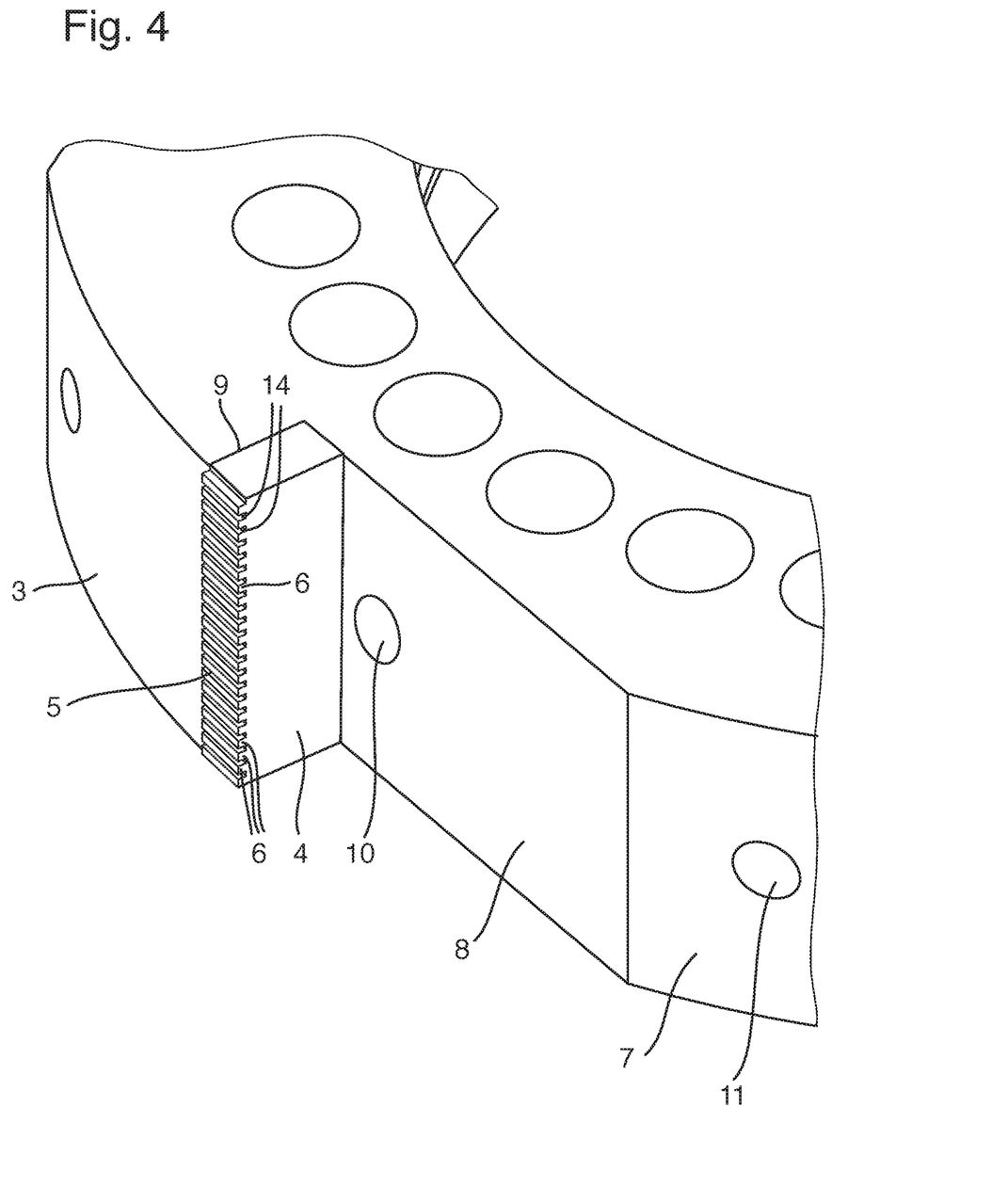
FIG. 4 shows a schematic perspective representation of the cutting element arranged on the cutting ring.

A slit contour 5 is introduced in the surface of the cuboid cutting element 4 facing outward in a radial direction. An enlarged representation of the cutting element 4 is shown in FIG. 4. The slit contour 5 has a series of cutting edges 6 facing in a rotational direction 16 of the cutting ring 3. The cutting edges 6 of the cutting element 4 are arranged close enough to each other so that they introduce all of the required slits in the inner cylinder wall needed for the coating layer to adhere when the slit contour 5 comes in contact with the inner cylinder wall. Cutting grooves 14 are arranged between the cutting edges 6.

FIGS. 3 and 4 also show a number of cooling channel holes 10 that are drilled into the second circumferential section 8. The cooling channel hole 10 is arranged close to the cutting element 4 and is connected to the cooling channel 12 shown in FIG. 2 in a manner familiar to a person skilled in the art. A coolant is guided by the cooling channel 12 into the cooling channel hole 10 that exits in the proximity of the cutting element 4 from the cutting ring 3. Under the rotation of the cutting ring 3, the coolant is pressed against the cutting element 4, and the cutting element 4 is thereby cooled. The cooling channel hole 10 can be formed at an angle from the radial to the cutting element 4, or respectively in the direction of the circumferential section 9.

In addition to the cooling channel holes 10, the cutting ring 3 preferably has flushing holes 11 in addition or alternatively as shown in FIGS. 3 and 4. The flushing holes 11 are preferably each arranged in the first circumferential section 7.

The flushing holes 11 are connected to a flushing channel 13 (not directly visible in FIG. 2) that is arranged in the mandrel 2 in a manner familiar to a person skilled in the art. A flushing agent can be introduced into and/or removed from the flushing holes 11, wherein the flushing agent removes the chips arising during the cutting process and thereby prevents an interruption of the cutting process by these chips.

The flushing hole 11 can be designed radial or at an angle to the radial so that drainage or removal of chips from an outer region into an inner region of the cutting ring 3 is simplified. In the latter case, an angle between 10° and 60°, in particular preferably between 25° and 45°, is provided between the first circumferential section 7 and the flushing hole 11.

Figure 5:
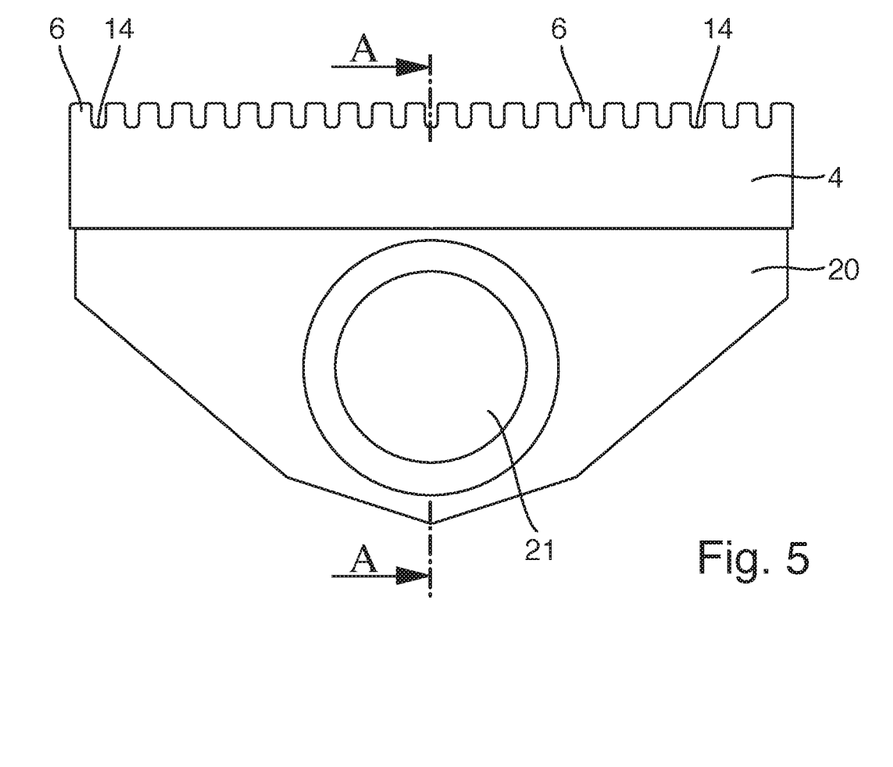
FIG. 5 shows a schematic front view of a holding apparatus with a cutting element.

FIG. 5 shows a schematic front view of a holding apparatus 20 with a cutting element 4 arranged thereupon. The holding apparatus 20 can be fastened to the cutting ring 3 by means of a screw that is guided through the hole 21. The contour of the cutting ring 3 can be adapted to the contour of the holding apparatus 20. Preferably, the contours are shaped complementary to each other. In FIG. 3 and FIG. 4, on the one hand the contour of the cutting ring 3 would then be correspondingly adapted to the contour of the holding apparatus 20 and, on the other hand, the holding apparatus 20 with the cutting element 4 from FIG. 5 arranged thereupon would replace the cutting element 4 from FIGS. 3 and 4.

Figure 6:
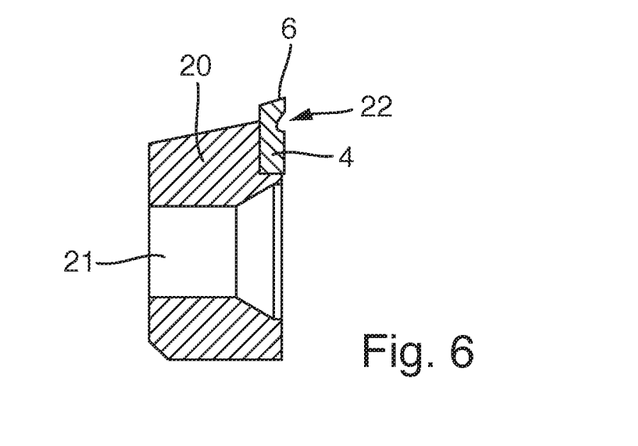
FIG. 6 shows a schematic sectional representation of a holding apparatus from FIG. 5 along line A-A.

FIG. 6 schematically illustrates a cross-section along line A-A from FIG. 5. The holding apparatus 20 with the hole 21 is shown, as well as the location at which the cutting element 4 is attached. The cutting element 4 can have an undercut, or respectively a chamfer 22 for a better cut. Alternatively, the chamfer 22 can also be omitted, and a flat front surface can be provided.

Figure 7:
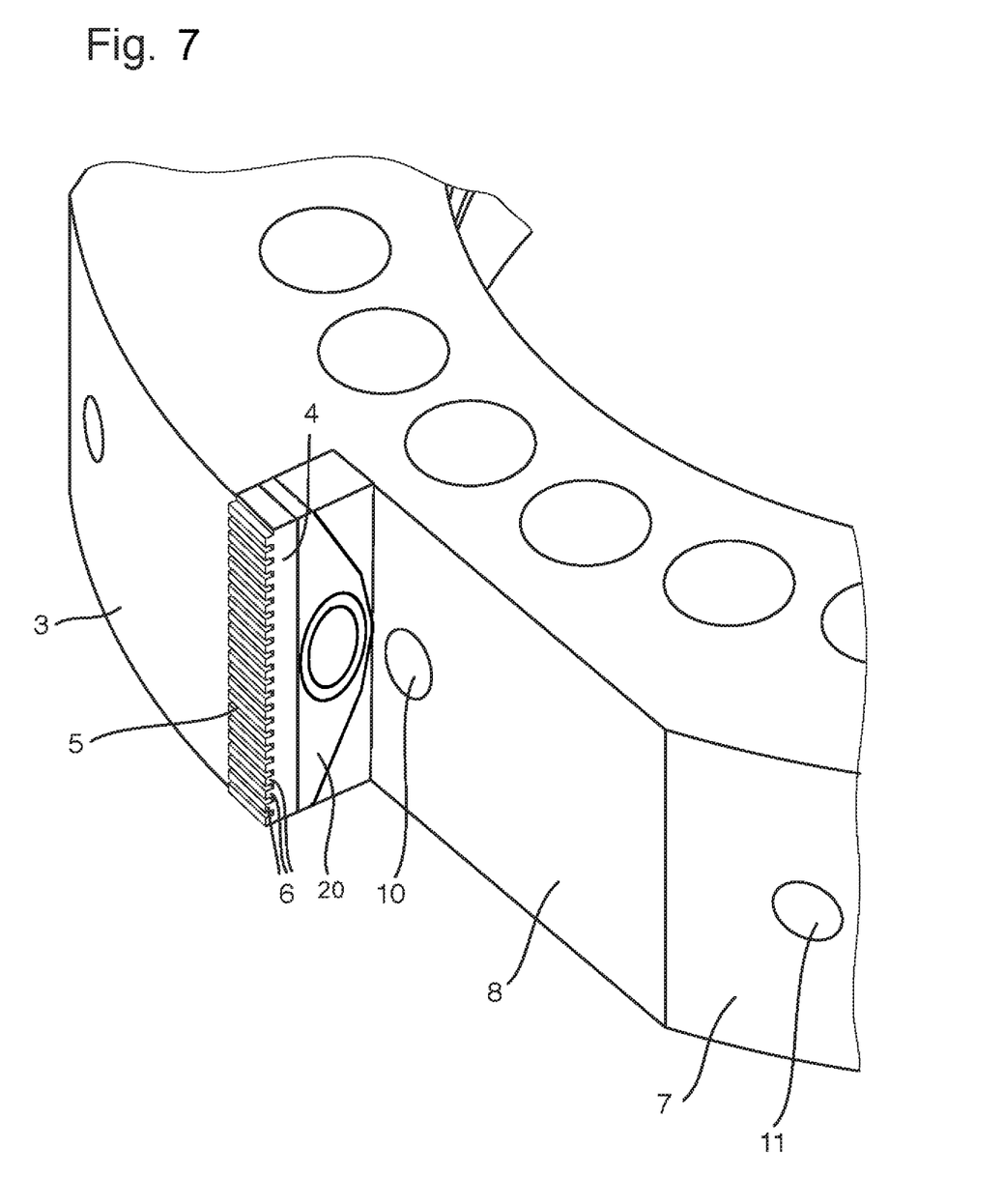
FIG. 7 shows a holding apparatus with a cutting element releasably fastened to a cutting ring.

FIG. 7 shows a holding apparatus 20 with a cutting element 4 as shown in FIG. 5 releasably fastened to a cutting ring 3 as shown in FIG. 4.

All named features, including those taken from the drawings alone and individual features, which are disclosed in combination with other features, are considered alone and in combination as essential for the invention. Embodiments according to the invention can be fulfilled through individual features or a combination of several features. In the context of the invention, features which are designated with "in particular" or "preferably" are to be understood as optional features.

REFERENCE NUMBER LIST

1 Apparatus for processing cylinder walls of internal combustion engines
2 Mandrel
3 Cutting ring
4 Cutting element
5 Slit contour
6 Cutting edges
7 First circumferential section
8 Second circumferential section
9 Third circumferential section
10 Cooling channel hole
11 Flushing hole
12 Cooling channel
13 Flushing channel
14 Cutting groove
15 Rotational axis
16 Rotational direction
20 Holding apparatus
21 Hole
22 Chamfer

What is claimed is:

1. An apparatus for processing cylinder walls of internal combustion engines, the apparatus comprising:
a cutting element;
a rotary cutting ring; and
a holding apparatus;
wherein the cutting element is attached to the holding apparatus,
wherein the holding apparatus is releasably fastened to an outer section of the cutting ring,
wherein the cutting element has a slit contour with a plurality of individual cutting edges arranged next to each other in a direction of an axis of rotation of the rotary cutting ring,
wherein the individual cutting edges face in a direction of rotation of the rotary cutting ring, and
wherein a plurality of cutting rings are arranged by means of a mandrel on a common axis of rotation.

2. The apparatus according to claim 1, wherein the cutting element is made of a material comprising diamond.

3. The apparatus according to claim 1, wherein the cutting element is made of diamond.

4. The apparatus according to claim 1, wherein the cutting element is substantially cuboid, wherein the slit contour is introduced into a surface of the cuboid cutting element by cutting grooves.

5. The apparatus according to claim 1, wherein a plurality of cutting elements are arranged on the cutting ring, wherein a longitudinal axial position with regard to the axis of rotation of at least one cutting edge of a first cutting element of the plurality of cutting elements is offset relative to the longitudinally axial position with regard to the axis of rotation of at least one cutting edge of a second cutting element of the plurality of cutting elements.

6. The apparatus according to claim 1, wherein the cutting rings are configured to be rotatable and releasably fixed relative to each other at any angular distances in the direction of rotation when mounted on the mandrel.

7. The apparatus according to claim 1, wherein the cutting ring has a cooling channel hole for cooling the cutting element in at least another outer section with an outer radius that continuously changes in the direction of rotation.

8. The apparatus according to claim 1, wherein the cutting ring has a flushing hole in at least another outer section with a substantially constant outer radius for removing chips generated during cutting.

9. An apparatus for processing cylinder walls of internal combustion engines, the apparatus comprising a cutting element arranged on a rotary cutting ring, wherein the cutting element has a slit contour with a plurality of individual cutting edges arranged next to each other in a direction of an axis of rotation of the rotary cutting ring, wherein the individual cutting edges face in a direction of rotation of the rotary cutting ring, and wherein the cutting ring has at least a first outer circumferential section with a substantially constant outer radius, at least a second outer circumferential section with an outer radius that continuously changes in the direction of rotation, and at least a third outer circumferential section with an outer edge that runs substantially in a radial direction.

10. The apparatus according to claim 9, wherein a surface of the cutting element lies on the second outer circumferential section of the cutting ring, and another surface of the cutting element lies on the third outer circumferential section of the cutting ring.

11. An apparatus for processing cylinder walls of internal combustion engines, the apparatus comprising:
a cutting element arranged on a rotary cutting ring; and
a holding apparatus;
wherein the cutting element has a slit contour with a plurality of individual cutting edges arranged next to each other in a direction of an axis of rotation of the rotary cutting ring,
wherein the individual cutting edges face in a direction of rotation of the rotary cutting ring,
wherein the holding apparatus is releasably connectable to the cutting ring, and
wherein the cutting ring has at least a first outer circumferential section with a substantially constant outer radius, at least a second outer circumferential section with an outer radius that continuously changes in the direction of rotation, and at least a third outer circumferential section with an outer edge that runs substantially in a radial direction.

12. The apparatus according to claim 11, wherein a surface of the holding apparatus lies on the second outer circumferential section of the cutting ring, and another surface of the cutting element lies on the third outer circumferential section of the cutting ring.

* * * * *